United States Patent
Huang

(10) Patent No.: US 12,434,186 B2
(45) Date of Patent: Oct. 7, 2025

(54) METHOD FOR PURIFICATION OF ELECTRONIC GASES AND A PURIFICATION DEVICE FOR THE METHOD

(71) Applicant: Tronic Purity, Inc., Hsinchu (TW)

(72) Inventor: Po-Wei Huang, Hsinchu (TW)

(73) Assignee: TRONIC PURITY, INC., Hsinchu (TW)

( * ) Notice: Subject to any disclaimer, the term of this patent is extended or adjusted under 35 U.S.C. 154(b) by 557 days.

(21) Appl. No.: 17/944,230

(22) Filed: Sep. 14, 2022

(65) Prior Publication Data

US 2024/0082780 A1    Mar. 14, 2024

(51) Int. Cl.
*B01D 53/22* (2006.01)
*B01D 65/02* (2006.01)
*B01D 69/08* (2006.01)

(52) U.S. Cl.
CPC .......... *B01D 53/22* (2013.01); *B01D 53/226* (2013.01); *B01D 65/02* (2013.01); *B01D 69/08* (2013.01); *B01D 2053/224* (2013.01); *B01D 2256/10* (2013.01); *B01D 2257/104* (2013.01); *B01D 2257/108* (2013.01)

(58) Field of Classification Search
CPC ...... B01D 53/22; B01D 53/226; B01D 65/02; B01D 69/08; B01D 2053/224; B01D 2256/10; B01D 2257/104; B01D 2257/108
See application file for complete search history.

(56) References Cited

U.S. PATENT DOCUMENTS

| | | | | |
|---|---|---|---|---|
| 2,958,391 A * | 11/1960 | Derosset | ................. | C01B 3/505 95/56 |
| 4,144,040 A * | 3/1979 | Claes | ................... | B01D 53/266 55/498 |
| 6,953,497 B2 * | 10/2005 | Edlund | ..................... | C01B 3/38 95/56 |
| 10,213,728 B2 * | 2/2019 | Hafner | ................. | B01D 15/361 |
| 2004/0182242 A1 * | 9/2004 | Mitani | ............. | B01D 71/02231 96/11 |
| 2006/0037476 A1 * | 2/2006 | Edlund | ................... | C01B 3/501 96/4 |
| 2006/0060084 A1 * | 3/2006 | Edlund | .................. | B01D 53/22 95/55 |
| 2010/0018397 A1 * | 1/2010 | Ishibe | ..................... | C01B 3/505 95/55 |
| 2011/0303543 A1 * | 12/2011 | Fritze | .................... | C02F 1/4691 204/554 |
| 2012/0060692 A1 * | 3/2012 | Haring | .................. | B01D 53/22 96/10 |
| 2018/0126330 A1 * | 5/2018 | Edlund | ............ | B01D 71/02231 |
| 2018/0161736 A1 * | 6/2018 | Coignet | ............ | B01D 63/0233 |

(Continued)

*Primary Examiner* — Anthony R Shumate
(74) *Attorney, Agent, or Firm* — WPAT, PC

(57) ABSTRACT

A method for purification of electronic gases and a purification device for the method are disclosed: a purification device is internally equipped with a plurality of hollow fiber tubes for purification and outward discharge of an unpurified electronic gas; a purification device which is not operating gas purification allows purified electronic gases to pass for discharges of fine dusts from the purification device wherein the purified electronic gases after completion of renewal process are delivered into the purification device in which no gas purification is running for restore of backpressure in the device.

3 Claims, 13 Drawing Sheets

(56) References Cited

U.S. PATENT DOCUMENTS

2019/0111368 A1* 4/2019 Crippen ................ C02F 1/001
2021/0402349 A1* 12/2021 Edlund ................ C01B 3/501
2022/0386886 A1* 12/2022 Wu ..................... G16H 30/40

* cited by examiner

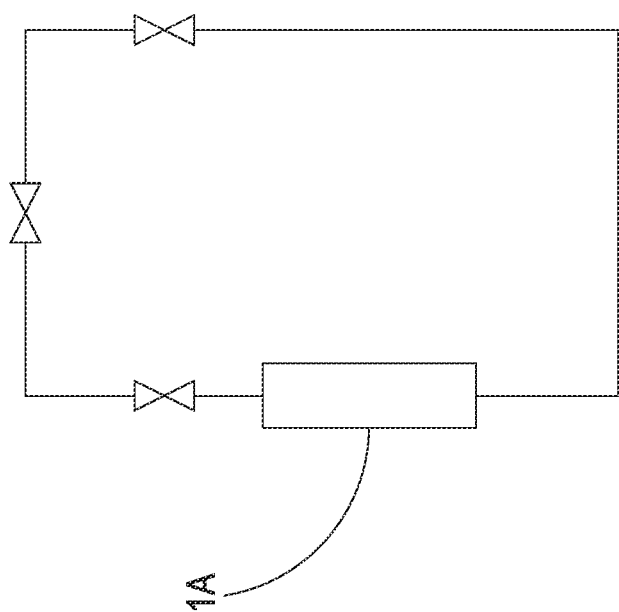

METHOD FOR PURIFICATION OF ELECTRONIC GASES AND A PURIFICATION DEVICE FOR THE METHOD

BACKGROUND OF THE INVENTION

1. Field of the Invention

The present application relates to a method for purification of electronic gases and a purification device for the method in which electronic gases are purified through a purification device and the purification device is reclaimed.

2. Description of Related Art

Electronic gases which are indispensable materials for the electronic industry such as super-large-scale integration (VLSI) ICs, flat panel displays, compound semiconductor devices, solar cells and optical fibers have been widely applied in manufacturing processes like thin film, etching, doping, vapor deposition and diffusion. For example, 50 different electronic gases are being supplied to more than 450 state-of-the-art wafer manufacturing processes in a VLSI factory.

In general, the yield and reliability of wafer chips manufactured is subject to purity of electronic gases directly. Accordingly, purified electronic gases are very critical. The several methods to purify electronic gases are shown as follows:
  (1) Purification of argon/helium: As shown in FIG. 1A for purification through a single purification bottle, getters in a purification bottle 1A, which cannot be reclaimed/reused for next purification of argon/helium, are classified as consumables. Moreover, switchable multiple purification bottles are unavailable because of single purification bottles in most practical cases.
  (2) Purification of hydrogen: As shown in FIG. 1B, adsorbers in a purification bottle 1B are applicable to adsorption of $H_2O$, $O_2$, CO or $CO_2$ rather than $CH_4$ or $N_2$, each of which should be captured by getters in a purification bottle 1C. However, adsorbers in the purification bottle 1B, which can be reclaimed and reused compared with unclaimed getters in the purification bottle 1C, are also classified as non-reusable consumables.
  (3) Purification of nitrogen: As shown in FIG. 1C for purification based on catalysts in a purification bottle 1D and adsorbers in a purification bottle 1E, $CH_4$ reacts with trace of oxygen ($O_2$) injected additionally and catalysts are heated to 250 degrees Celsius for production of $CO_2$ and $H_2O$ in nitrogenous environment in which $CH_4$ and $N_2$ are not adsorbed by adsorbers alone. Then, other impurities are adsorbed in a purification bottle 1E during purification. However, the step of catalysts added for purification of nitrogen is troublesome and improvable.
  (4) Purification of oxygen: Despite no extra oxygen ($O_2$) injected for purification of oxygen as shown in FIG. 1C, $CH_4$ reacts with trace of oxygen ($O_2$) injected additionally and catalysts are heated to 250 degrees Celsius for production of $CO_2$ and $H_2O$ in nitrogenous environment. Then, other impurities are adsorbed in a purification bottle 1E during purification. However, the step of catalysts added for purification of oxygen is troublesome and improvable. Moreover, other facilities which are indispensable to removal of nitrogen not adsorbed by adsorbers alone raise the cost inevitably.

Accordingly, electronic gases in the present disclosure are purified through hollow fiber tubes in which different gaseous impurities are adsorbed and multiple materials are added for removals of various gaseous impurities during purification without extra facilities. Moreover, a method for purification of electronic gases in the present disclosure comprises steps for renewal process which is supported by purified electronic gases for the purpose of reuse. The present application which is characteristic of cost reduction due to significantly less replacement of consumables compared with consumables used in the prior art can be considered as a preferred solution.

SUMMARY OF THE INVENTION

A method for purification of electronic gases, comprising:
  (1) connecting at least two purification devices with a gas input unit, wherein a plurality of hollow fiber tubes are provided inside the purification device, the gas input unit configured for feeding an unpurified electronic gas into the purification device for gas purification to remove impurities, and a purified electronic gas is discharged outwardly from the purification device;
  (2) diverting the discharged purified electronic gas to a pressure regulator through which the purified electronic gas is depressurized and the depressurized electronic gas is heated and further delivered into any purification device which is not operating gas purification;
  (3) discharging the purified electronic gas, after depressurized and heated process, from the purification device which is not operating gas purification such that impurities adsorbed by the plurality of hollow fiber tubes are taken away for completion of renewal process; and
  (4) After completing the renewal process, delivering a purified electronic gas, neither depressurized nor heated, into the purification device which is not operating gas purification to fill backpressure inside the purification device.

Specifically, the impurities which are removed by the purification device through the plurality of hollow fiber tubes comprise one or more substances from the group of water ($H_2O$), oxygen ($O_2$), nitrogen ($N_2$), hydrogen ($H_2$), methane ($CH_4$), carbon monoxide (CO), carbon dioxide ($CO_2$), non-methane hydrocarbon (NMHC), argon (Ar), nitrogen oxide (NO x), total organic carbon (TOC), acids, bases, refactory compounds, propylene glycol monomethyl ether (PGME) and monoethanolamine (MEA).

Specifically, when the impurities removed by the purification device comprise oxygen ($O_2$), hydrogen ($H_2$) is injected into the purification device which is not operating gas purification to remove the impurities like residual oxygen ($O_2$) inside the plurality of hollow fiber tubes during the renewal process.

Specifically, argon (Ar) is injected into the purification device which is not operating gas purification for purging and removal of residual hydrogen ($H_2$) inside the plurality of hollow fiber tubes in the case of hydrogen leakage when the unpurified electronic gas or the removed impurity is hydrogen ($H_2$).

Specifically, the purification device, the gas input unit, the pressure regulator and a filter are connected through different tubes in which each of tubes connected with the purification device for gas purification features a diameter greater than a diameter of each of tubes connected with the purification device for renewal process and a gas flow rate for renewal process is 1-5% of a gas flow rate for gas purification.

A purification device comprises: a gas cylinder with a front opening and a rear opening; a gas purification assembly positioned inside the gas cylinder and comprising at least a purification material body in which a bunch of hollow fiber tubes are filled; a front cover body covered on the front opening of the gas cylinder and comprising a front gas port thereon as well as a front sintered metal filter with multiple front gas vents at an inner side of the front cover body, wherein a front gas flowing space is formed between the front gas port and the front sintered metal filter, and a front space is formed between the front sintered metal filter and one end of the purification material body; and a rear cover body covered on the rear opening of the gas cylinder and comprising a rear gas port thereon as well as a rear sintered metal filter with multiple rear gas vents at an inner side of the rear cover body, wherein a rear gas flowing space is formed between the rear gas port and the rear sintered metal filter, a rear space is formed between the rear sintered metal filter and the other end of the purification material body, and the rear gas vent features its bore diameter less than bore diameter of the front gas vent.

Specifically, the front gas vent features a bore diameter ranging from 100 mm to 200 mm and the rear gas ventfeatures a bore diameter ranging from 20 mm to 100 mm.

Specifically, the gas purification assembly further comprises a front metal sleeve ring, a rear metal sleeve ring and at least a metal clamp, the purification material body is fastened with the front metal sleeve ring at one end and the rear metal sleeve ring at the other end, and each of the front metal sleeve ring and the rear metal sleeve ring is welded and fixed on an inner wall of the gas cylinder.

BRIEF DESCRIPTION OF THE DRAWINGS

FIG. 1A is a schematic view for simple structure of purification of argon/helium in the prior art.

FIG. 4A-2 is a schematic view for an application in a method for purification of electronic gases and a purification device for the method.

FIG. 4A-3 is a schematic view for an application in a method for purification of electronic gases and a purification device for the method.

FIG. 4B-1 is a schematic view for an application in a method for purification of electronic gases and a purification device for the method.

FIG. 4B-2 is a schematic view for an application in a method for purification of electronic gases and a purification device for the method.

FIG. 4B-3 is a schematic view for an application in a method for purification of electronic gases and a purification device for the method.

DETAILED DESCRIPTION OF THE PREFERRED EMBODIMENTS

The technical contents, features and effects of a method for purification of electronic gases and a purification device for the method are clearly explained in preferred embodiments and accompanying drawings as follows.

Figure 1B:
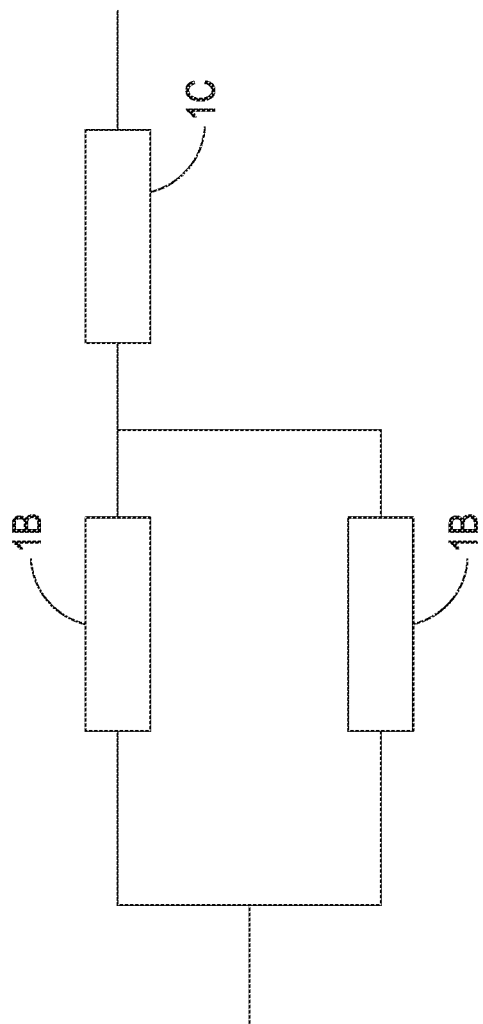
FIG. 1B is a schematic view for simple structure of purification of hydrogen in the prior art.
Figure 1C:
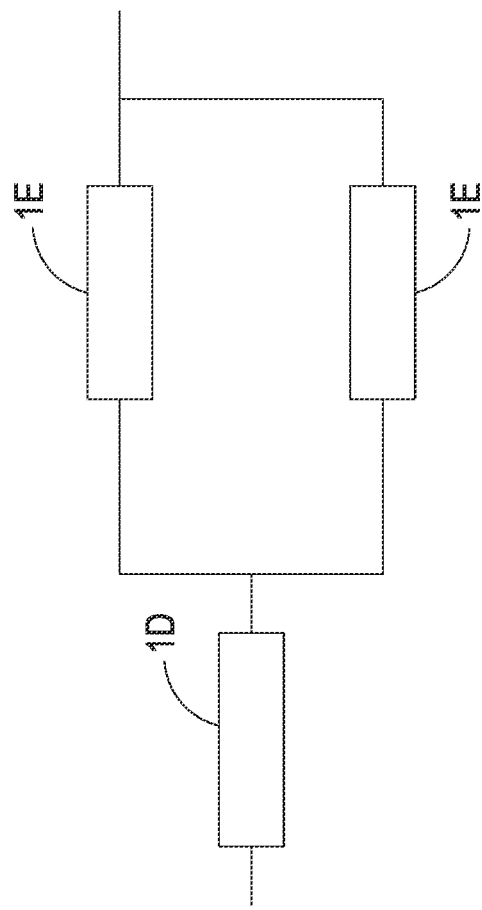
FIG. 1C is a schematic view for simple structure of purification of nitrogen/oxygen in the prior art.
Figure 2:
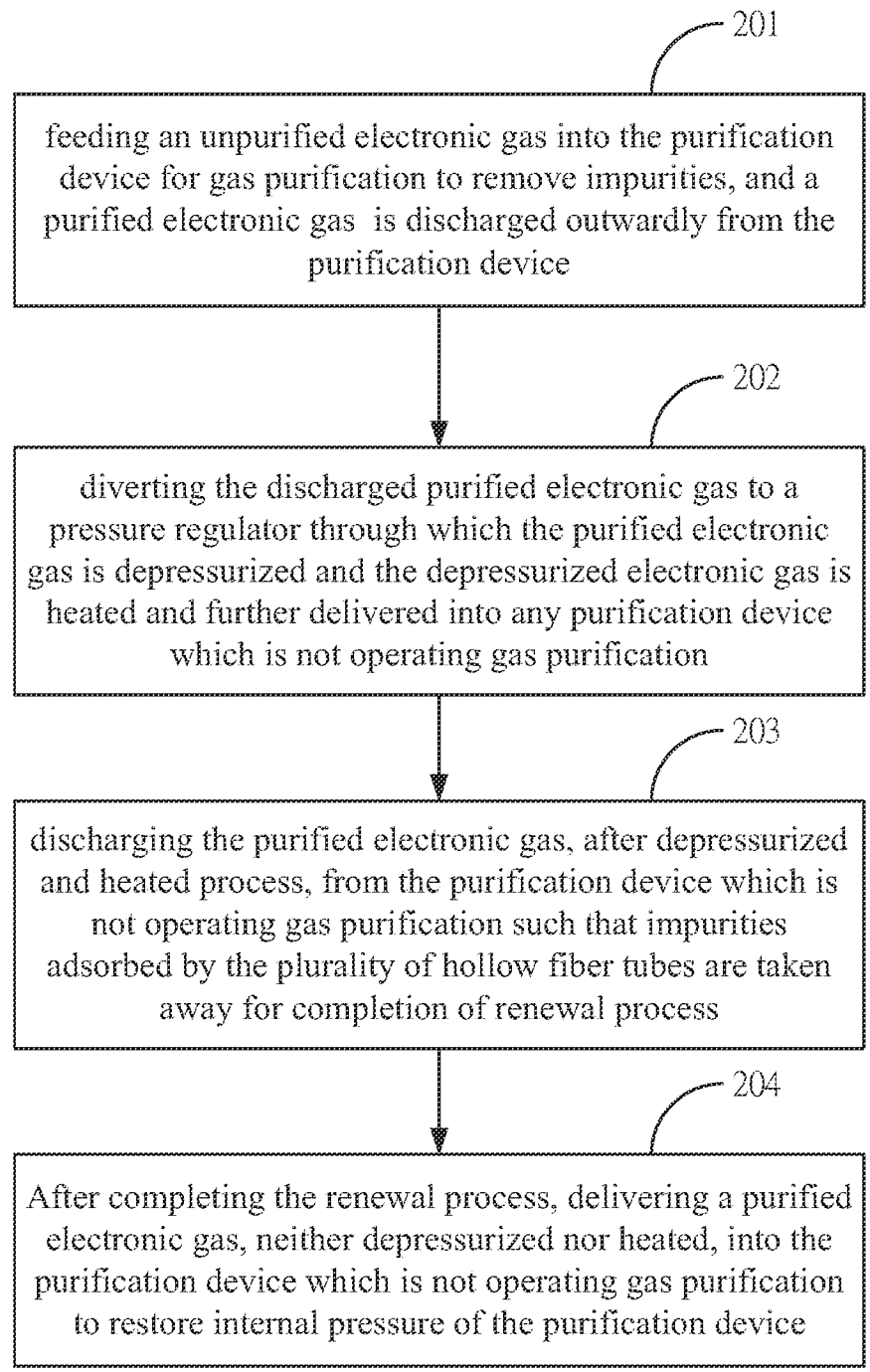
FIG. 2 is a flowchart about a method for purification of electronic gases and a purification device for the method.

Referring to FIG. 2, which illustrates a flowchart with respect to a method for purification of electronic gases and a purification device for the method wherein the method is shown as follows:

(1) At least two purification devices are connected with a gas input unit wherein each purification device is filled with a plurality of hollow fiber tubes inside and the gas input unit is capable of feeding an unpurified electronic gas into the purification device for gas purification and removals of impurities after which the purified electronic gas will be discharged outward from the purification device 201;

(2) The purified electronic gas which has been discharged is distributed to a pressure regulator through which the electronic gas is depressurized and the depressurized electronic gas is heated and further delivered into a purification device which is not operating gas purification 202;

(3) The purified electronic gas, depressurized and heated, is discharged from the purification device which is not operating gas purification such that impurities adsorbed by a plurality of hollow fiber tubes are taken away for completion of renewal process 203; and (4) After renewal process, a purified electronic gas, neither depressurized nor heated, is delivered into the purification device in which no gas purification is running for restore of backpressure inside the purification device 204.

In step 201, each of different purification devices is connected with a gas input unit through a purifying gas intake tube wherein the gas input unit is used in driving an unpurified electronic gas into the purification device through a purifying gas intake tube for gas purification and discharging a purified electronic gas outward from the purification device through a purifying gas exhaust tube.

In the present disclosure, a purifying gas intake tube and a purifying gas intake control valve are connected with each other in series wherein the purifying gas intake control valve is capable of regulating entry of an unpurified electronic gas into the purification device; a purifying gas exhaust tube and a purifying gas exhaust control valve are connected with each other in series wherein the purifying gas exhaust control valve is capable of regulating discharge of the purified electronic gas outward through the purifying gas exhaust tube.

In step 202, the purifying gas exhaust tube is distributed to and connected with the pressure regulator and each of different purification devices is connected with the pressure regulator through a renewal gas intake tube. The pressure regulator receives a purified electronic gas discharged outward through the purifying gas exhaust tube; the purified electronic gas, depressurized and heated, is delivered into a purification device not running for gas purification from the renewal gas intake tube.

In the present disclosure, the pressure regulator and a gas intake manifold are connected with each other in series; the gas intake manifold and a gas intake control valve are further connected with each other in series. The gas intake control valve located between the purifying gas exhaust control valve and the pressure regulator is used in regulating entry of a purified electronic gas discharged outward from the purifying gas exhaust tube into the pressure regulator.

In step 203, each of different purification devices is connected with an exhaust outlet through a renewal gas exhaust tube and the purified electronic gas, depressurized and heated, is discharged through the renewal gas exhaust tube for removals of fine dusts inside a plurality of hollow fiber tubes and completion of renewal process.

In the present disclosure, the renewal gas intake tube and a renewal gas intake control valve are connected with each other in series; the renewal gas intake control valve is used in regulating entry of the purified electronic gas, depressurized and heated, into a purification device which is not operating gas purification; the renewal gas exhaust tube and a renewal gas exhaust control valve are connected with each other in series such that the purified electronic gas, depressurized and heated, is discharged through the renewal gas exhaust tube controllably.

After completion of renewal process in step 204, a purified electronic gas (neither depressurized nor heated) is delivered into a purification device in which no gas purification is running through a renewal gas intake tube connected with another purification device in which gas purification is running as well as an opened renewal gas intake control valve linking another renewal gas intake tube such that backpressure inside the purification device is restored and equal to the pressure of gas injected by the gas input unit.

Because of a gas flow rate for renewal process lower than a lower gas flow rate for purification, the diameter of each tube connected for gas purification is larger than the diameter of each tube connected with a purification device for renewal process. For lower energy consumption, a gas flow is depressurized through a pressure regulator before entry into a purification device. The gas flows required in renewal process are explained as follows:
  (1) In the present disclosure, a renewal gas flow rate for renewal process is 1-5% (1%, 1.5%, 2%, 2.5%, 3%, 3.5%, 4%, 4.5% or 5%) of a purifying gas flow rate for purification. As shown in a preferred embodiment, a r renewal gas flow rate is set as 2.5% of a purifying gas flow rate. Moreover, an upper limit is set for a renewal gas flow rate, that is, the upper limit is the maximum gas flow rate which is not surpassed at renewal process. The detailed examples are shown as follows:
    (a) Purifying gas flow rate of 100 $Nm^3$/hr for purification: the renewal gas flow rate is 2.5 $Nm^3$/hr, 2.5% of the purifying gas flow rate.
    (b) Purifying gas flow rate of 500 $Nm^3$/hr for purification: the renewal gas flow rate is 12.5 $Nm^3$/hr, 2.5% of the purifying gas flow rate.
    (c) Purifying gas flow rate of 10,000 $Nm^3$/hr for purification: the renewal gas flow rate is 125 $Nm^3$/hr (upper limit), 2.5% of the purifying gas flow rate.
  (2) In the present disclosure, the diameter of a tube connected for renewal process is based on a renewal gas flow. The detailed examples are shown as follows:
    (a) Renewal gas flow rate less than or equal to 10 $Nm^3$/hr: the diameter of a tube connected ranges from 0.25 to 0.5 inch;
    (b) Renewal gas flow rate less than or equal to 25 $Nm^3$/hr: the diameter of a tube connected ranges from 0.5 to 0.75 inch;
    (c) Renewal gas flow rate less than or equal to 125 $Nm^3$/hr: the diameter of a tube connected ranges from 0.75 to 1 inch.

Figure 3A:
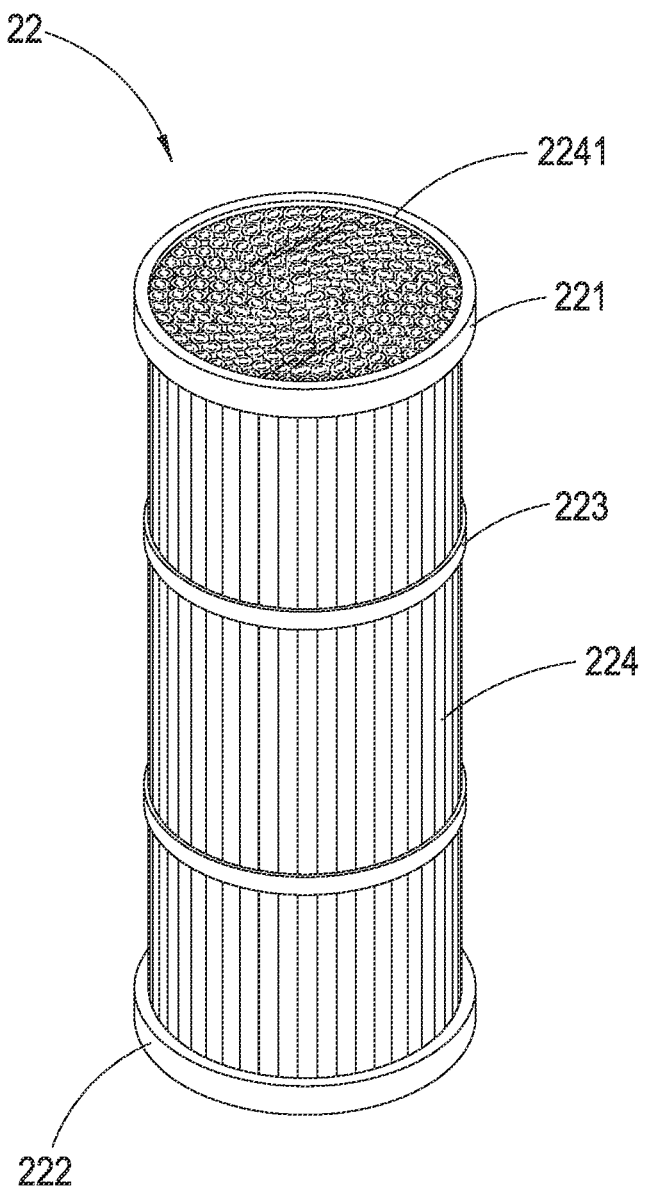
FIG. 3A is a schematic view for structure of a gas purification assembly in a method for purification of electronic gases and a purification device for the method.
Figure 3B:
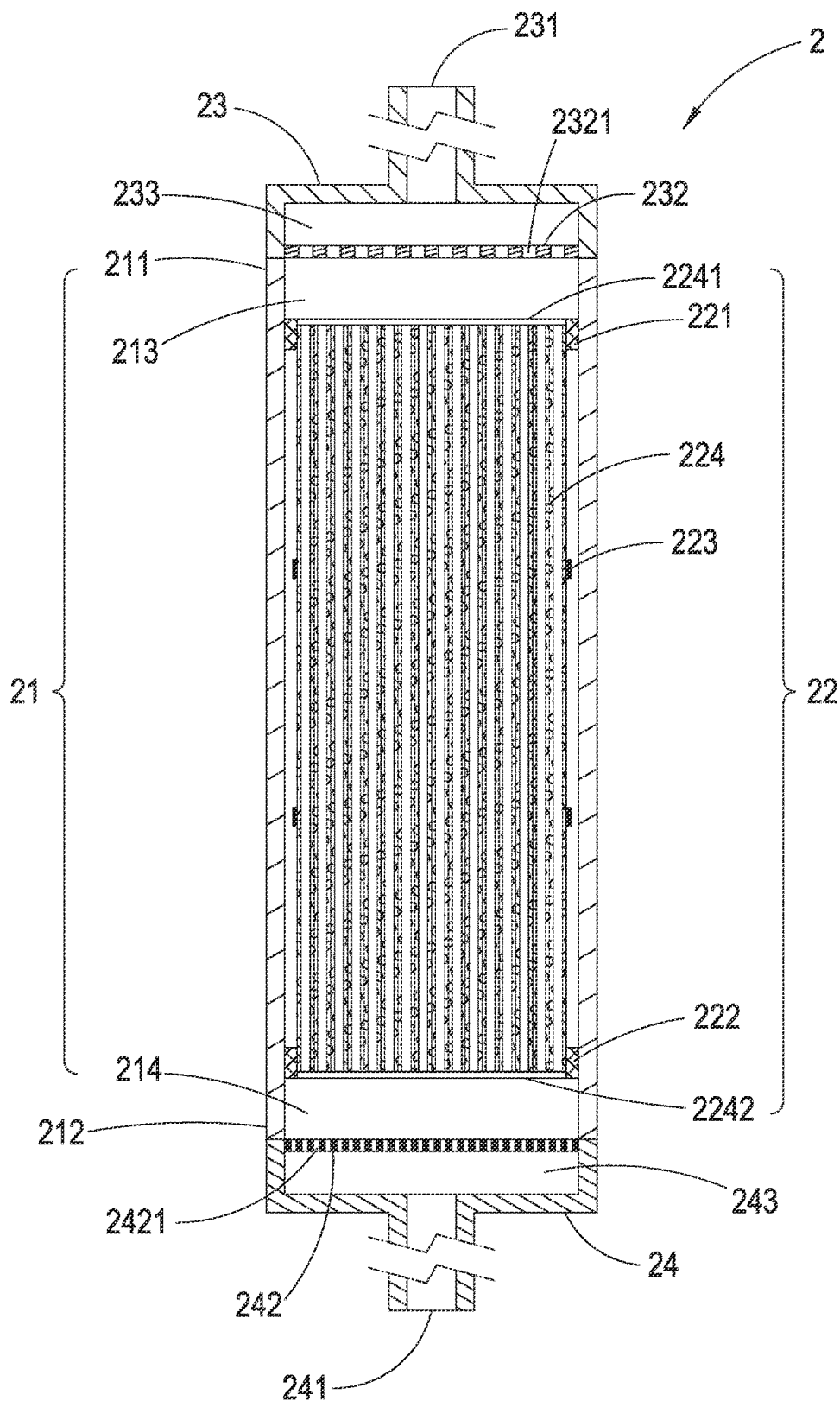
FIG. 3B is a schematic sectional view of a purification device in a method for purification of electronic gases and a purification device for the method.
Figure 3C:
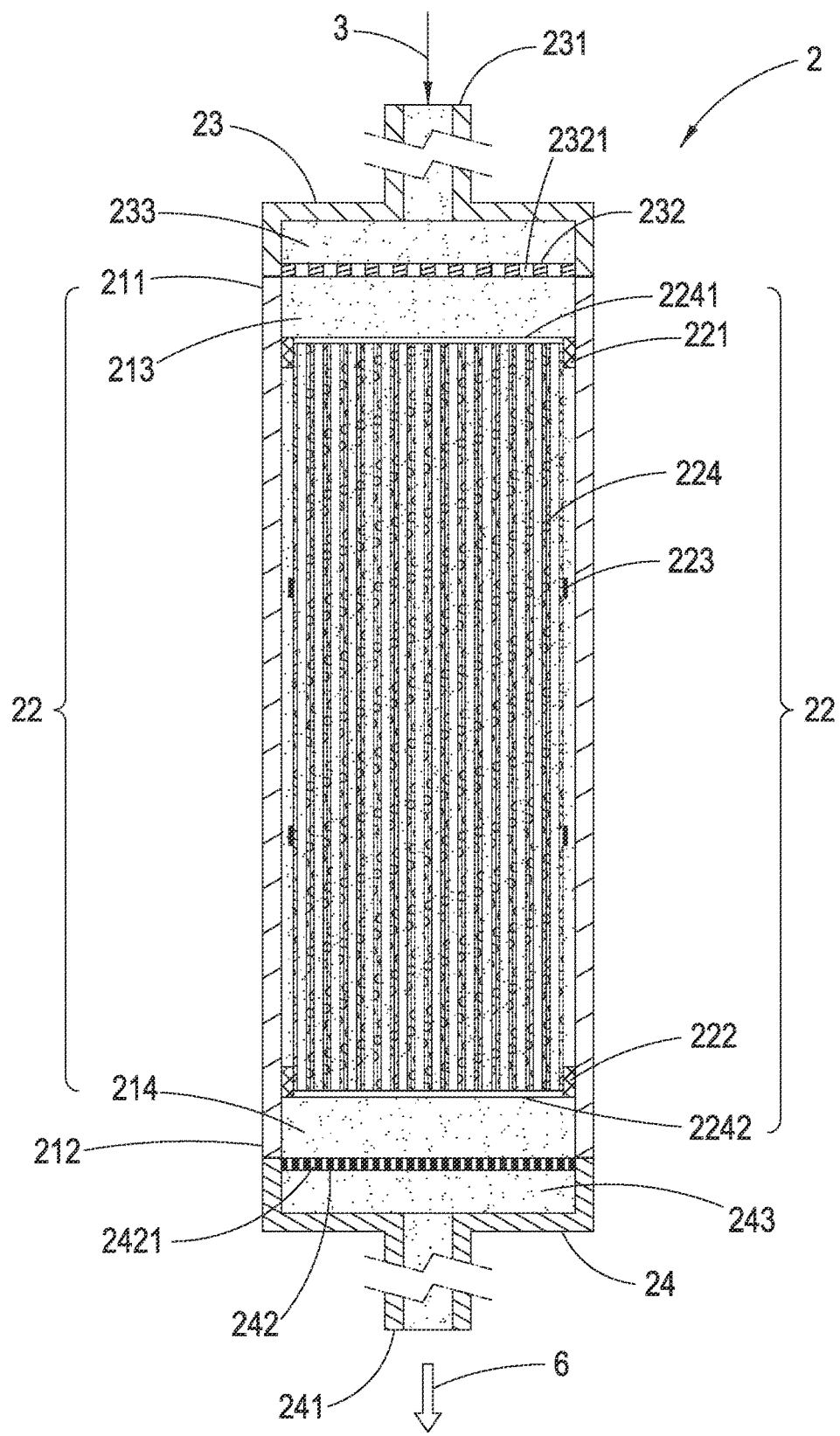
FIG. 3C is a schematic view for flowing gas purification in a method for purification of electronic gases and a purification device for the method.

As shown in FIGS. 3A, 3B and 3C, the purification device 2 comprises a gas cylinder 21, a gas purification assembly 22, a front cover body 23 and a rear cover body 24: the gas cylinder 21 has a front opening 211 and a rear opening 212; the gas purification assembly 22 is positioned inside the gas cylinder 21.

The gas purification assembly 22 comprises a front metal sleeve ring 221, a rear metal sleeve ring 222, at least a metal clamp 223 and a purification material body 224: the purification material body 224, which comprises a plurality of hollow fiber tubes, is fastened with the front metal sleeve ring 221 at one end and the rear metal sleeve ring 222 at the other end wherein each of the front metal sleeve ring 221 and the rear metal sleeve ring 222 is welded and fixed on an inner wall of the gas cylinder 21 without shaking of the gas purification assembly 22 inside the gas cylinder.

The purification material body 224 is covered with protective films 2241, 2242 on the top end and the rear end, respectively.

The gas purification assembly 22 cannot adhere to inside of the gas cylinder 21 with adhesives, which are brittle substances while contacting with hot gases for renewal process that leave an obvious peeling at a junction behind, collapsing the gas purification assembly 22 and weakening the effect of gas purification by the purification device 2 after renewal process.

The front cover body 23 covered on the front opening 211 has a front gas port 231 on the surface and a front sintered metal filter 232 at the internal side; the front sintered metal filter 232 is designed to form multiple front gas vents 2321 thereon.

The rear cover body 24 covered on the rear opening 212 has a rear gas port 241 on the surface and a rear sintered metal filter 242 at the internal side; the rear sintered metal filter 242 is designed to form multiple rear gas vents 2421 thereon.

Each of the front sintered metal filter 232 and the rear sintered metal filter 242 features a thickness ranging from 2.5 to 4.5 mm and preferably 3 mm.

Each of the front gas vents 2321 features a bore diameter ranging from 100 to 200 mm (100 mm, 101 mm, 105 mm, 110 mm, 115 mm, 120 mm, 125 mm, 130 mm, 135 mm, 140 mm, 145 mm, 150 mm, 155 mm, 160 mm, 165 mm, 170 mm, 175 mm, 180 mm, 185 mm, 190 mm, 195 mm or 200 mm); each of the front gas vents 2321 allows gases from the front gas port 231 to be distributed into the gas purification assembly 22 gradually and remained inside the purification device 2 much longer.

Each of the rear gas vents 2421 features a bore diameter ranging from 20 to 100 mm (20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 99 mm or 100 mm) For gases remained inside the purification device 2 much longer, a gas flow which is being discharged through the gas purification assembly 22 collides with the rear sintered metal filter 242 first and bounces back from the rear sintered metal filter 242 (under the backpressure effect) because the diameter of each rear gas vent 2421 in design is less than that of each front gas vent 2321.

In the case of neither the front gas vents 2321 nor the rear gas vents 2421, a gas flow directly accesses and quickly passes through the gas purification assembly 22. Because the duration of gases staying inside the gas purification assembly 22 has an effect on gas purification, the front sintered metal filter 232 and the rear sintered metal filter 242, both of which are installed in the present disclosure, contribute to higher backpressure with which gases to be purified move slowly for better purification of electronic gases.

The front gas port 231 and the front sintered metal filter 232 form a front gas flowing space 233 in between. Unpurified gases which are diffusing and contacting with all front gas vents 2321 under the function of the front gas flowing space 233 are delivered into the gas purification assembly 2 through multiple front gas vents 2321. The effect for influx of unpurified gases diffusing gradually is subject to the undersized front gas flowing space 233 that cuts back on the duration of unpurified gases staying inside the purification device 2. Accordingly, the front sintered metal filter 232 should stay away from the front gas vents 2321.

The rear gas port 241 and the rear sintered metal filter 242 form a rear gas flowing space 243 in between. The rear gas flowing space 243 keeps the rear sintered metal filter 242 away from the rear gas port 241 such that purified gases contact with all rear gas vents 2421 first and access rear gas port 241 by diffusing from the multiple rear gas vents 2421.

Both the front cover body 23 and the rear cover body 24 are welded and fixed on the front opening 211 and rear opening 212, respectively. Because of high soldering temperature, one position at which the front cover body 23 (the rear cover body 24) is weld on the front opening 211 (the rear opening 212) should be separated from the other position of the front metal sleeve ring 221 (the rear metal sleeve ring 222) vertically (that is, two positions are separated by a front space 213 (a rear space 214)) such that the purification material body 224 of the gas purification assembly 22 does not melt down at high soldering temperature.

As shown in FIG. 3C for the unpurified electronic gas 3 delivered into the purification device 2, impurities are adsorbed and removed through a plurality of hollow fiber tubes of the purification material body 224 in which capillary pores exist wherein impurities can be one or more substances among water ($H_2O$), oxygen ($O_2$), nitrogen ($N_2$), hydrogen ($H_2$), methane ($CH_4$), carbon monoxide (CO), carbon dioxide ($CO_2$), non-methane hydrocarbon (NMHC), argon (Ar), nitrogen oxide ($NO_x$), total organic carbon (TOC), acids (for example, $SO_2$), bases (for example, $NH_3$), refactory compounds (for example, HMDSO), propylene glycol monomethyl ether (PGME) and monoethanolamine (MEA). Then, the purified electronic gas 6 in which no impurity exists is discharged from the rear gas port 241.

As shown in FIGS. 4A-1, 4A-2 and 4A-3, the details to remove an impurity such as water ($H_2O$), oxygen ($O_2$), nitrogen ($N_2$), hydrogen ($H_2$), methane ($CH_4$), carbon monoxide (CO), carbon dioxide ($CO_2$) or non-methane hydrocarbon (NMHC) from nitrogen ($N_2$), argon (Ar), air or carbon dioxide ($CO_2$) are described as follows:

(1) Purification (route A):
 (a) A purification/renewal process unit 5 is equipped with purification devices 51, 52, each of which is connected with a gas input unit 4 through a purifying gas intake tube 53, wherein the gas input unit 4 is used in delivering an unpurified electronic gas 3 through a purifying gas intake tube 53 and the unpurified electronic gas 3 due to a purifying gas intake control valve 53A opened (and a purifying gas intake control valve 53B closed) is introduced into the purification device 51 for purification and discharge of a purified electronic gas 6;
 (b) A purifying gas exhaust tube 54 and a purifying gas exhaust control valve 54A are connected with each other in series and the purifying gas exhaust control valve 54A is used in discharge of the purified electronic gas 6 into a gas output unit 7 through the purifying gas exhaust tube 54.

(2) Renewal process (route B):
 (a) The purified electronic gas 6 is distributed by a purifying gas exhaust tube through a first manifold 55, a second manifold 56 and a renewal gas intake tube 57 wherein the purifying gas exhaust control valve 54A, a distributing gas intake control valve 561, a pressure regulator 562 and a renewal gas intake control valve 57B are opened (but the purifying gas exhaust control valve MB and a renewal gas intake control valve 57A are closed);
 (b) The purified electronic gas 6 is received and depressurized by a pressure regulator 562, heated by a gas pre-heater 59B (or by a gas pre-heater 59A for renewal process in the purification device 51) and delivered into the purification device 52;
 (c) After a renewal gas exhaust control valve 58B is opened (and a renewal gas exhaust control valve 58A is closed), the purified electronic gas 6, depressurized and heated, contacts with a filter 9 through a renewal gas exhaust tube 58 for filtrations of particle impurities and is further discharged from an exhaust outlet 10 for removals of fine dusts inside a plurality of hollow fiber tubes and completion of renewal process;
 (d) After completion of renewal process, the purified electronic gas 6 is distributed and delivered into the purification device 52 by passing through the opened renewal gas intake control valve 57A and the renewal gas exhaust control valve 58B such that the backpressure inside the purification device 52 is boosted and comparable to the pressure of an unpurified electronic gas 3 injected by the gas input unit 4 for no situation like instantaneous pressure drop or instantaneous backpressure attributed to differential pressures before purification switched to the purification device 52.

(3) Injection of renewal gases (route C):
 (a) In the case of an impurity, for example, oxygen ($O_2$), existing, hydrogen ($H_2$) for renewal process should be injected into a purification device in which no gas purification is running for removal of oxygen ($O_2$) inside a plurality of hollow fiber tubes;
 (b) A renewal gas injection unit 8, which is installed between the renewal gas intake control valve 57A and the renewal gas intake control valve 57B, and the pressure regulator 562 are connected with each other in series wherein the renewal gas injection unit 8 is used in injecting a renewal gas 11 (hydrogen ($H_2$)) for synthesis of water by hydrogen ($H_2$) and an impurity (i.e., oxygen ($O_2$)) and discharge of water during renewal process.

In the case of removing an impurity like water ($H_2O$), oxygen ($O_2$), nitrogen ($N_2$), methane ($CH_4$), carbon monoxide (CO), carbon dioxide ($CO_2$) or non-methane hydrocarbon (NMHC) by hydrogen ($H_2$), no extra hydrogen ($H_2$)

is injected through the renewal gas injection unit 8 for renewal process. Purification is mentioned previously and not further explained.

Figures 1, 4A:
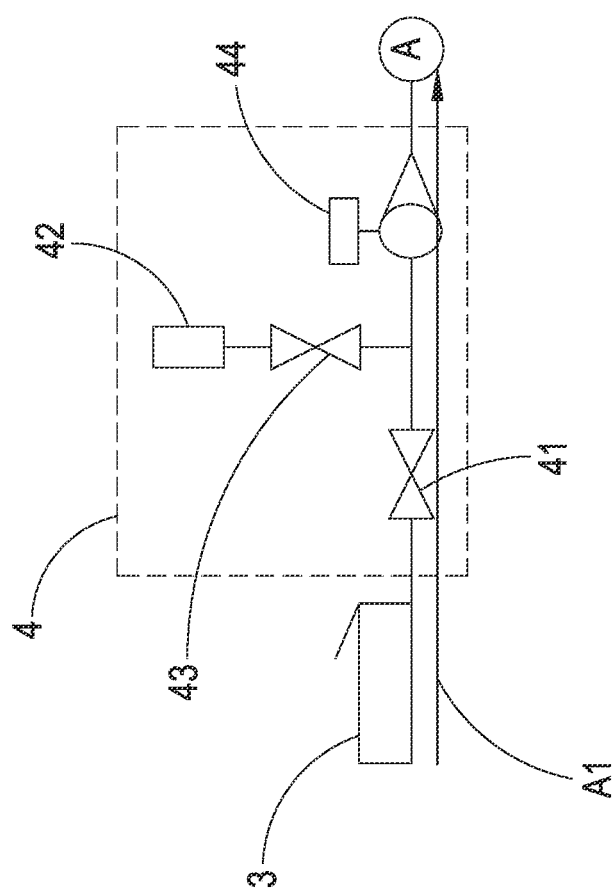
FIG. 4A-1 is a schematic view for an application in a method for purification of electronic gases and a purification device for the method.
Figures 2, 4A:
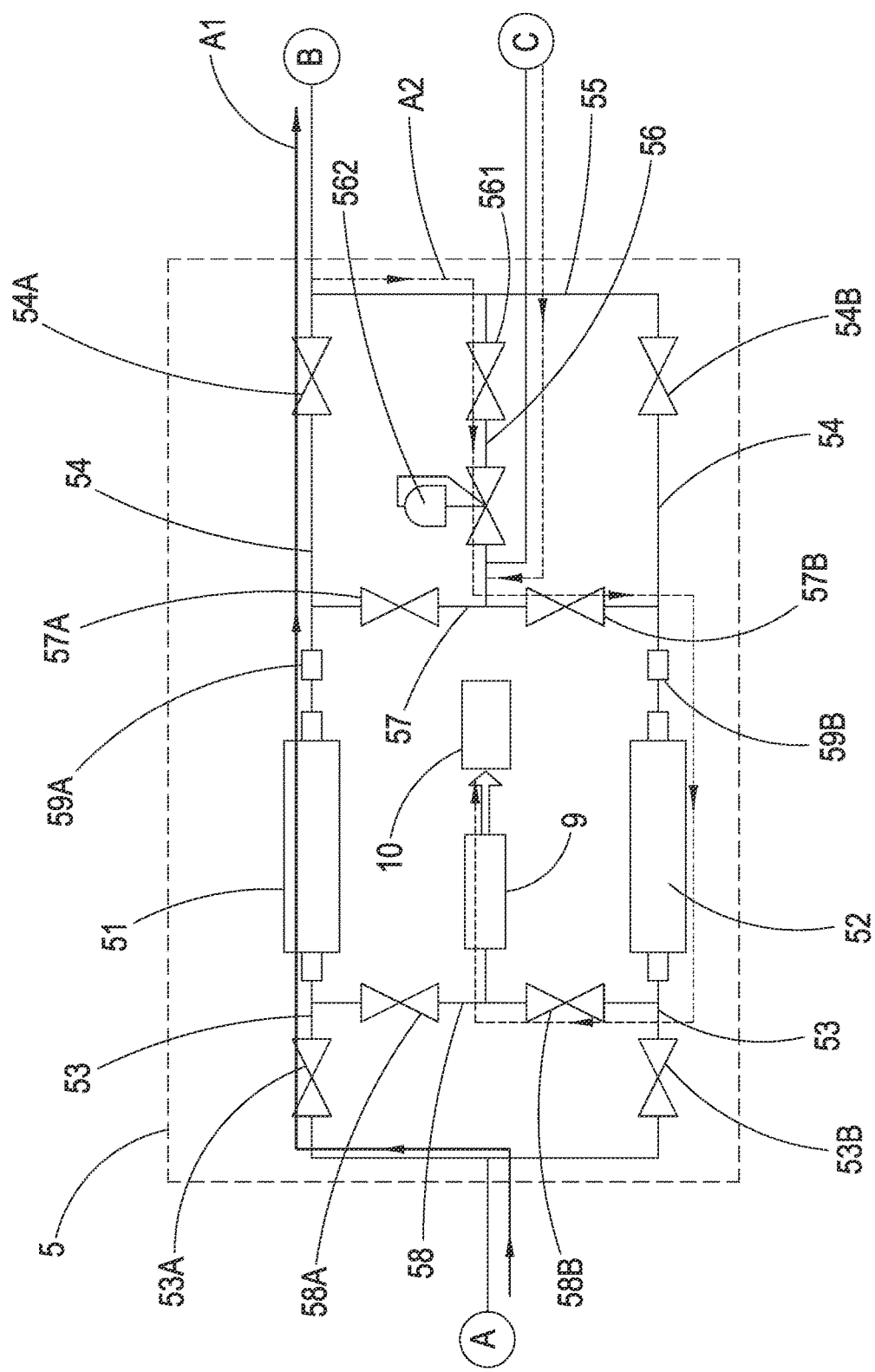
Figures 3, 4A:
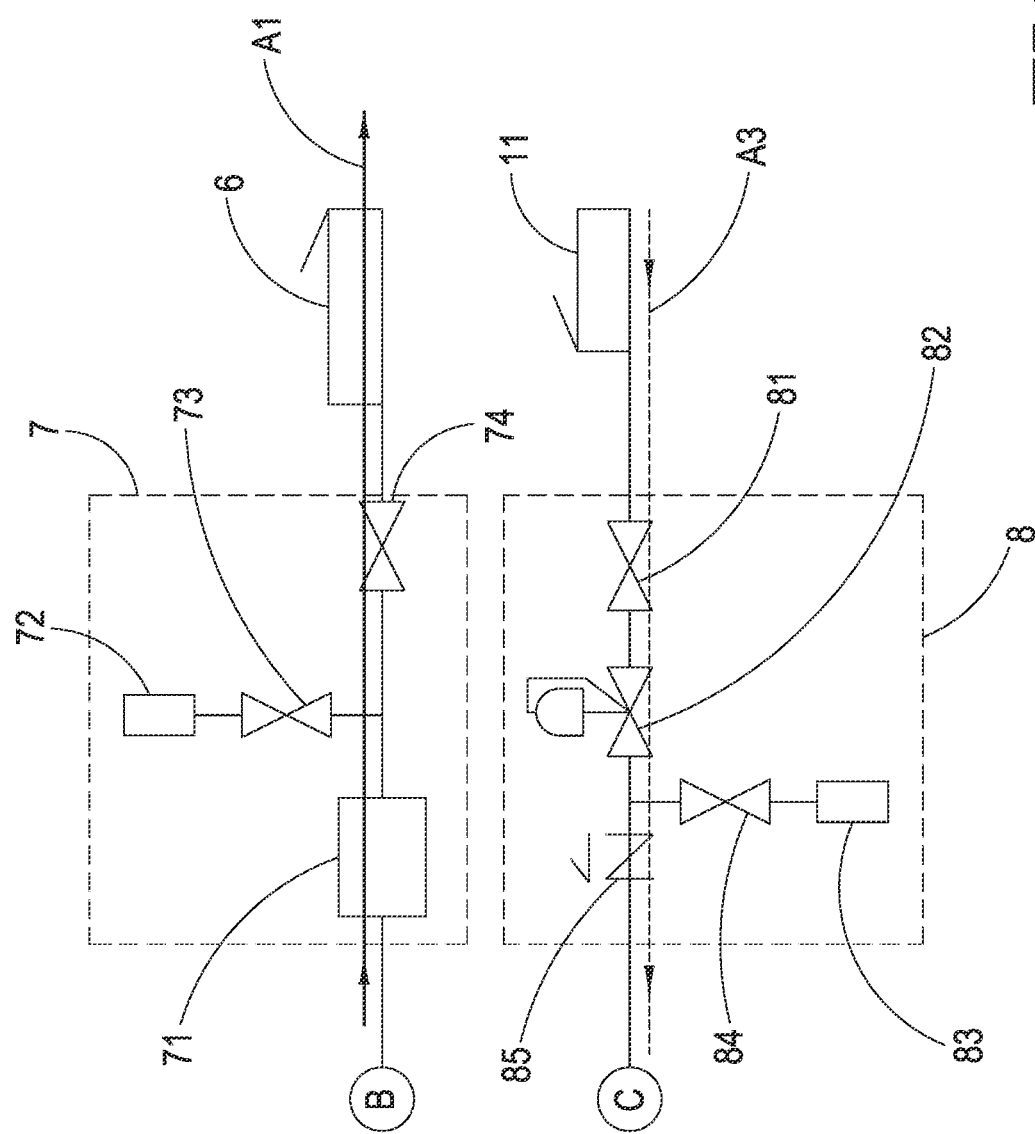

When hydrogen ($H_2$) as a renewal gas is injected or an impurity of hydrogen ($H_2$) is removed as shown in FIG. 4A-3, a purge process is indispensable to movement of a purification device or hydrogen ($H_2$) leakage. A renewal gas 11 (for example, argon (Ar)) injected through the renewal gas injection unit 8 passes through the renewal gas intake control valve 57B, the purification device 52, the renewal gas exhaust control valve 58B and the filter 9 to dissipate residual hydrogen ($H_2$) inside tubes of a purification device from an exhaust outlet 10.

In the case of injecting oxygen ($O_2$) to remove an impurity like water ($H_2O$), hydrogen ($H_2$), methane ($CH_4$), carbon monoxide (CO), carbon dioxide ($CO_2$) or non-methane hydrocarbon (NMHC) as shown in FIGS. 4B-1, 4B-2 and 4B-3, the only difference from the above similar example of injecting hydrogen ($H_2$) to remove an impurity is no extra hydrogen ($H_2$) injected by the renewal gas injection unit 8.

Figures 1, 4B:
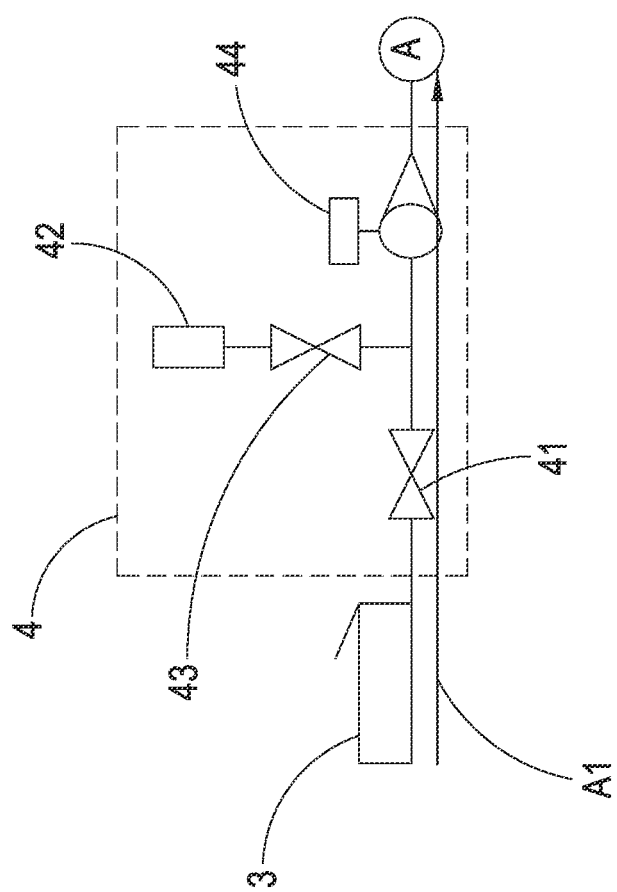
Figures 2, 4B:
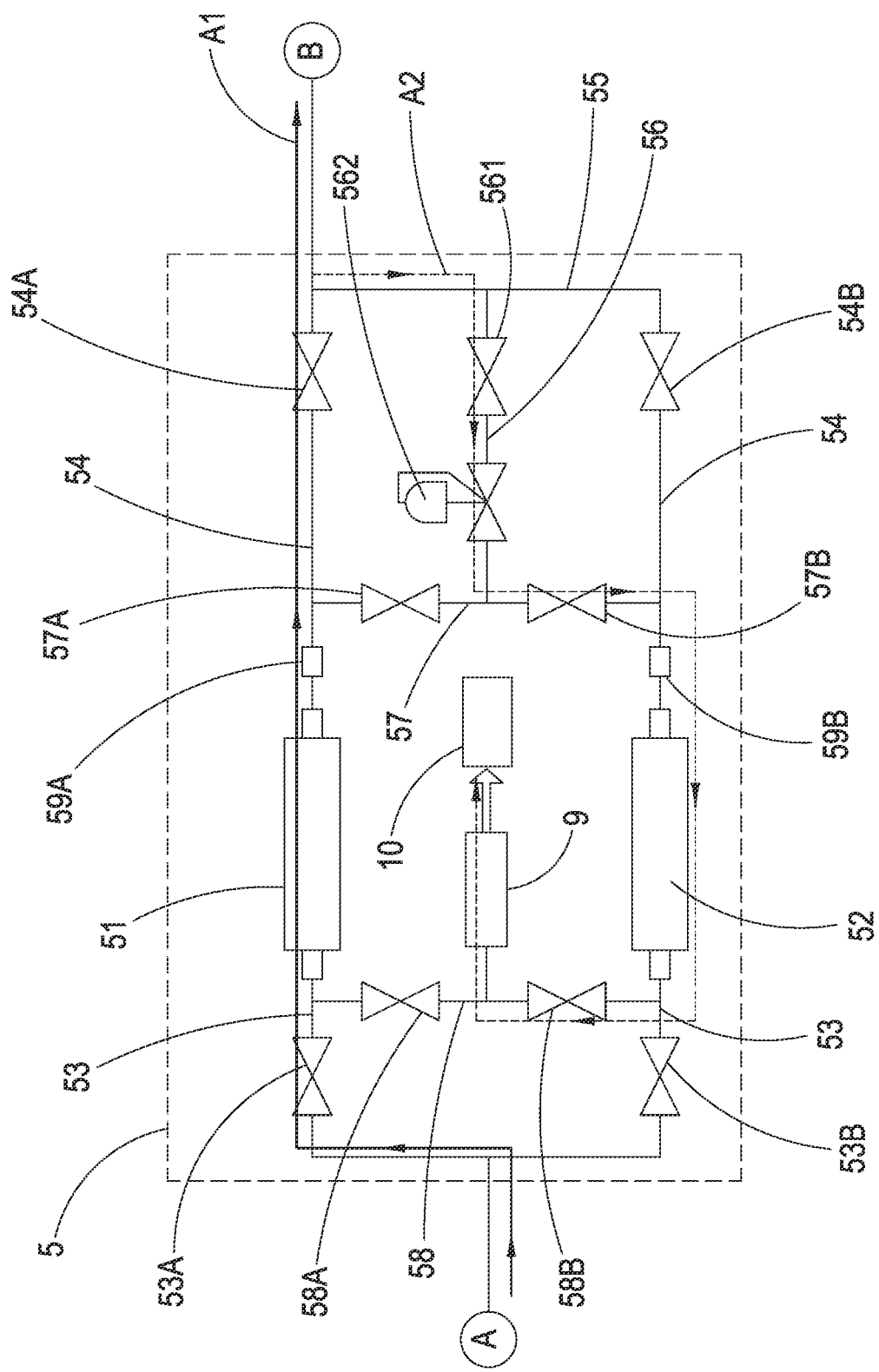
Figures 3, 4B:
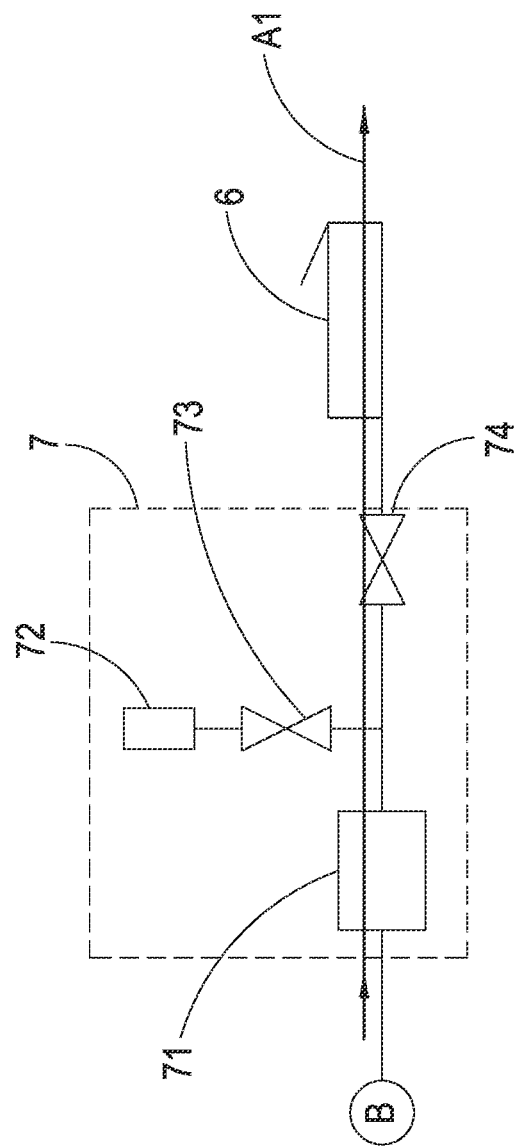

As shown in FIGS. 4A-1 and 4B-1, the gas input unit 4 comprises a component 41, a component 42, a component 43 and a component 44 wherein the component 41, the component 42, the component 43 and the component 44 are a control valve, a pressure transducer, a manual valve/an electrically operated valve and a gas flow meter, respectively.

As shown in FIGS. 4A-3 and 4B-3, the gas output unit 7 comprises a component 71, a component 72, a component 73 and a component 74 wherein the component 71, the component 72, the component 73 and the component 74 are a particle filter, a pressure transducer, a control valve and a manual valve/an electrically operated valve, respectively.

As shown in FIG. 4A-3, the renewal gas injection unit 8 comprises a component 81, a component 82, a component 83, a component 84 and a component 85 wherein the component 81, the component 82, the component 83, the component 84 and the component 85 are a control valve, a pressure regulator, a pressure transducer, a control valve and a check valve, respectively.

A method for purification of electronic gases and a purification device for the method have following advantages compared with the prior art:

1. The hollow fiber tubes matching up with purification of electronic gases in the present disclosure prove effective in adsorbing different gaseous impurities which are removed by materials added in the hollow fiber tubes instead of additional facilities for purification.
2. A method for purification of electronic gases in the present disclosure matches up with steps for renewal process which is supplemented by purified electronic gases for reuses.
3. A method for purification of electronic gases in the present disclosure is applicable to switchable dual/multiple lines compared with a facility for purification of argon/helium in the prior art and is available to renewal process/reuse for cost reduction of consumables.
4. A method for purification of electronic gases in the present disclosure is characteristic of no getter compared with purification of hydrogen in the prior art and a purification device for the method is available to renewal process/reuse for cost reduction of consumables.
5. A method for purification of electronic gases in the present disclosure is characteristic of neither catalysts compared with the other method for purification of nitrogen in the prior art nor diversified facilities for adsorption, which are replaced by a single type of purification device for the same effect.
6. A method for purification of electronic gases in the present disclosure is characteristic of neither catalysts compared with the other method for purification of oxygen in the prior art nor diversified facilities for adsorption, which are replaced by a single type of purification device for the same effect.

A method for purification of electronic gases and a purification device for the method have been disclosed in preferred embodiments which are not taken as examples to restrict the scope of the present application. Any change and/or modification made by the skilled persons who have general knowledge in the art and familiarize themselves with the above technical features and embodiments without departing from the spirit and scope of the present disclosure should be covered in claims of the patent specification.

What is claimed is:

1. A purification device, comprising:
   a gas cylinder with a front opening and a rear opening;
   a gas purification assembly positioned inside the gas cylinder and comprising at least a purification material body in which a bunch of hollow fiber tubes are filled;
   a front cover body covered on the front opening of the gas cylinder and comprising a front gas port thereon as well as a front sintered metal filter with multiple front gas vents at an inner side of the front cover body, wherein a front gas flowing space is formed between the front gas port and the front sintered metal filter, and a front space is formed between the front sintered metal filter and one end of the purification material body; and
   a rear cover body covered on the rear opening of the gas cylinder and comprising a rear gas port thereon as well as a rear sintered metal filter with multiple rear gas vents at an inner side of the rear cover body, wherein a rear gas flowing space is formed between the rear gas port and the rear sintered metal filter, a rear space is formed between the rear sintered metal filter and the other end of the purification material body, and the rear gas vent features its bore diameter less than bore diameter of the front gas vent.

2. The purification device as claimed in claim 1, wherein the front gas vent features a bore diameter ranging from 100 mm to 200 mm and the rear gas vent features a bore diameter ranging from 20 mm to 100 mm.

3. The purification device as claimed in claim 1, wherein the gas purification assembly further comprises a front metal sleeve ring, a rear metal sleeve ring and at least a metal clamp, the purification material body is fastened with the front metal sleeve ring at one end and the rear metal sleeve ring at the other end, and each of the front metal sleeve ring and the rear metal sleeve ring is welded and fixed on an inner wall of the gas cylinder.

* * * * *